2,898,185

ADSORPTION METHOD FOR SEPARATING THORIUM VALUES FROM URANIUM VALUES

George E. Boyd, Oak Ridge, Tenn., and Edwin R. Russell and Jack Schubert, Chicago, Ill., assignors to the United States of America as represented by the United States Atomic Energy Commission No Drawing. Application September 14, 1949
Serial No. 115,778

9 Claims. (Cl. 23—14.5)

The present invention relates to the separation of heavy elements and more particularly is concerned with the separation of thorium from uranium.

The ores of most thorium minerals contain uranium as well as thorium and it is very desirable to have efficient methods of separating these two elements. Uranium is also always contaminated with thorium since various thorium isotopes are natural decay products of the uranium isotopes found in nature. For example, $UX_1(_{90}Th^{234})$ is continually produced by the radioactive decay of the $U^{238}$ isotope as shown by the following schemes:

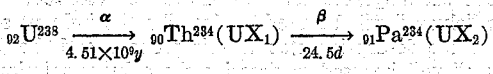

The purified radioactive thorium isotopes which may be obtained from natural uranium have wide uses as tracer isotopes, $UX_1$ being particularly valuable because of its relatively short half-life.

An object of the present invention is to provide a method for the separation of thorium values from aqueous solution, and for the concentration of said thorium values.

A further object of the present invention is to provide a method of separating thorium values from uranium values, particularly where the thorium is present in very small concentration with respect to the uranium.

Still other objects will be apparent from the following detailed description.

In accordance with the present invention it has been found that thorium values may be readily and quantitatively separated from an aqueous solution by the adsorption of thorium ions upon a suitable adsorbent. Substantial concentration of the thorium values can then be obtained by desorbing the thorium with a small quantity of an aqueous solution. It has further been found that thorium values can be separated from uranium values even when the thorium values are in very minute concentration with reference to the uranium values by the selective adsorption and desorption of said thorium values with suitable adsorbents. This process may be particularly advantageously carried out by making use of chromatographic adsorption techniques.

The preferred embodiment of the present invention comprises broadly the treating of an adsorbent, preferably of the cation exchange resin type, with an aqueous solution containing ionic thorium and uranium values whereby the thorium ions are preferentially adsorbed thereon resulting in the substantially complete adsorption of the thorium values and the adsorption of lesser percentages of the uranium ions. The adsorbed uranium values are then removed from the adsorbent by passing an aqueous dilute acid solution in contact with the adsorbent. This results in a separation of the thorium values from the uranium values. Following the desorption of the uranium values, the thorium values can then be recovered from the adsorbent by passing an aqueous acidic solution, preferably containing ions which will form a thorium complex, through the bed. The process of the present invention depends upon the extremely strong adsorption affinity of thorium for certain adsorbents, an affinity which is much greater than that of the uranium ions. The process of the present invention will effect a separation of thorium from uranium even when the thorium is present in very dilute concentration with respect to the uranium concentration, for example, less than $10^{-3}$ M thorium in an 0.1–1 M uranyl nitrate solution.

While it is contemplated that the process of this invention may be carried out with any adsorbent having an affinity for ionic species of thorium and uranium, including both inorganic adsorbents, such as silica gel, alumina, diatomaceous earth and the like, and organic adsorbents, such as activated carbon, sulfonated carbonaceous material and the like, it has been found that the cation exchange resins are particularly suitable adsorbents for use in this process. Examples of suitable resins include the phenol formaldehyde polymers containing free methylene sulfonic acid, carboxyl and phenolic groups described in U.S. Patents 2,104,501 (January 4, 1948), 2,151,883 (March 28, 1938), and 2,191,853 (February 27, 1940), and the cross-linked aromatic hydrocarbon polymeric resins containing nuclear sulfonic acid groups and belonging to the class of compounds described in U.S. Patent 2,366,007 (December 26, 1944). The average particle size of the resin particle used is not critical and may vary widely in size. It has been found, however, that in a column adsorption the 40–100 mesh sizes give the most desirable results. While the hydrogen type of resin is normally used, the cation of the prepared resin may be any cation having a lesser affinity for the resin than thorium. Thus, suitable resins include the uranyl, sodium, potassium and ammonium types.

There are various methods well known in the art of contacting adsorbents with solutions containing ionic species to bring about adsorption of the ionic species therefrom. The batch method is one of these methods which may be used in the present invention. This method comprises bringing the adsorbent into contact with an aqueous solution containing the thorium and uranium species. The thorium species will be preferentially adsorbed upon the adsorbent. The adsorbent then may be separated from the solution by any of the conventional methods of separating solids from liquids, such as centrifugation, filtration, etc., and the uranium separated from the adsorbent by contacting the adsorbent with a suitable solution which will desorb the less tightly bound uranium but leave the thorium upon the adsorbent. The thorium may then be recovered from the adsorbent by contacting the adsorbent with a solution which will desorb the thorium.

In a variant of the batch method, the adsorptive capacity of the particular resin used for thorium is first determined. The quantity of thorium contained in the thorium-uranium solution is analyzed. The solution, preferably containing less than $10^{-3}$ M thorium ions and between 0.1–1 M $UO_2^{+2}$ ions, is then contacted with a quantity of resin sufficient to adsorb the thorium but insufficient to adsorb all of the uranium. This method depends upon the fact that thorium has a much greater affinity for the resin than the uranium ions.

The generally preferred method for adsorbing and desorbing ionic species from solution is the column method also known as chromatographic adsorption. By this method, the adsorbent is packed into a cylindrical column and the solution containing the ionic species to be adsorbed is passed through the adsorbent bed in the column. Where two or more substances having different strengths of attraction for the adsorbent are contained in the influent solution, there will be a tendency for the substances to be adsorbed in strata or layers. The layers of adsorbate having higher adsorption affinity will, in the case of downward flow of solution through the column, be above the layer of adsorbates having lower adsorption affinity; thus, in the case of a downward flow of a solution containing ionic values of thorium and uranium, the thorium will be adsorbed in a separate bed from the uranium, said thorium bed lying above the uranium adsorption zone. Since the adsorbed ions of the two species will lie in separate zones, the mere passing of a solution containing ions of these two species through an adsorbent column bed will result in a separation of the two species. It is nearly always desirable to obtain the species in separate solutions, however, and there are, in general, three methods of doing this. The first method, and the one originally used in chromatographic adsorption, was the physical separation of the layers of resin containing the adsorbed substances and then separately contacting the resin layers with a desorbent for the particular species adsorbed thereon. The second method depends upon the fact that adsorption and desorption of the ionic species on the adsorbent is an equilibrium process. By this method, the original solution containing the ionic values or a similar solution is passed for a considerable length of time through the adsorbent bed. The continued passage of the solution results in the continuous adsorption and desorption of the separate layers of adsorbed substances so that these layers become progressively lowered in the case of downward flow of the solution in the column. By this progressive lowering of the adsorbed strata, the adsorbed species will eventually pass out of the column in the effluent solution in separate portions thereof, thus making it possible to obtain effluent portions containing the individual species desired.

The third and most efficient method of removing the adsorbed species is the method of using selective eluants. By this method, the first solution introduced is selected so that it will remove the ionic species having the lesser affinity for the adsorbent with the least possible movement of the adsorbent zone of the ionic species having the greater adsorptive affinity. The second solution introduced in the column is one selected to remove the more tightly bound adsorbed ionic species in the smallest possible quantity of solution. Thus, in the case of thorium and uranium adsorbed layers with the uranium layer lying below the thorium layer in the column, the first solution usually comprises a dilute acid in a quantity sufficient to remove substantially all of the uranium but insufficient to remove any substantial amount of the adsorbed thorium from the column. This quantity will depend upon the eluant used, the type of resin and the amount of adsorbed uranium, but may readily be determined in practice by analyzing a portion of the effluent to determine when the uranium desorption ceases. Since the uranium is more easily dissolved from the resin and since the uranium layer lies below the thorium layer in the column, this may usually be accomplished with a minimum of downward movement of the thorium layer in the column and with very little of the thorium being removed with the uranium effluent solution. The second solution is then passed through the column to remove the thorium. The thorium eluant may be a solution of the same kind as that used to remove the uranium but it is usually selected so that it contains ions with a complexing effect upon the adsorbed thorium ions. This will result in a more rapid removal of the adsorbed thorium ions, permitting the use of a smaller amount of eluant and resulting in a higher thorium concentration in the eluate.

The influent solution in the adsorption step of the process of this invention should be an aqueous solution containing thorium and uranium ions; dilute solutions of strong mineral acids, such as nitric acid, hydrochloric acid and sulfuric acid, are often used. Equally satisfactory solutions, however, may be prepared by dissolving suitable soluble thorium and uranium salts in water. The pH is usually maintained on the acid side to avoid formation of insoluble hydroxides. In a solution containing thorium ions, it is probable that there is a mixture of ionic species such as $Th^{+4}$, $Th(OH)^{+3}$, $ThO^{+2}$ and $Th(OH)_3^+$. Except in highly acid solutions, the predominant cations are probably $ThO^{+2}$ and $Th(OH)_3^+$ with the relative ratio of the two depending upon the acid concentration. There are probably similar variants of the uranium ionic species with the $UO_2^{+2}$ species probably predominating. The most efficient adsorption of the thorium is obtained from dilute solutions of the thorium ions. Thus, where a resin of the sulfonated phenol-formaldehyde type is used as the adsorbent, nearly 100% adsorption of the thorium will be obtained where the thorium is present in concentration of $10^{-3}$ M or less. This figure is based upon the use of a minimum amount of resin in the batch method. The maximum adsorptive capacity of the above resin is of the order of 1.7 milliequivalents of thorium per gram of bone dry resin. A maximum adsorption of the thorium from solutions of much higher concentration may, of course, be obtained where the column adsorption method involving an excess amount of resin is used. It has also been found desirable to maintain the uranyl concentration in the adsorption step influent to less than about 1 M in order to obtain the most efficient adsorption with the minimum amount of resin.

The solutions used to desorb the adsorbed substances from the adsorbent may be any solution containing cations exchangeable for the ions to be desorbed. The term "eluant" will be used to describe the influent solution in the desorption step of this process, and the term "eluate" will be used to describe the effluent solution in the desorption step. The preferred eluant for uranium is a dilute aqueous solution of a strong acid preferably one having an anion with which thorium does not form a complex ion. Dilute solutions of nitric acid, sulfuric acid and hydrochloric acid may be used and a 0.1–0.4 M sulfuric acid solution has been found to be very satisfactory with a 0.25 M sulfuric acid solution preferable. Aqueous solutions of acid-forming salts and the like in varying concentrations may also be used. The thorium eluant may be the same solution as is used for removal of the uranium with the exchangeable cation present either in the same or in greater concentration. Solutions, which have been found particularly effective in thorium removal because of the complexing effect of the anions present in the solution, are an approximately 1.25 M $NaHSO_4$ solution and an approximately 0.5 M $H_2C_2O_4$ solution. The last solution is very often used where the thorium is present in very small or tracer concentrations such as $10^{-3}$ M or less. Where the thorium is present in tracer concentrations and the oxalic acid eluant is used, the thorium may be further concentrated by adding sufficient inactive thorium ion to the eluate to cause a precipitation of thorium oxalate. This thorium oxalate precipitate may then be separated from the solution and dissolved in a small volume of 8 N $HNO_3$. A concentration factor of 200 may be realized by this additional step.

Now that the process of this invention has been broadly described, specific applications may be further illustrated by the following examples. The first example describes the result of experiments in which the batch method was used to separate thorium from aqueous solutions using a cation exchange resin as an adsorbent.

EXAMPLE I

The adsorbent used was a cation exchange resin of the methylene sulfonic acid type and was prepared by replacing the cation of the resin with uranyl ion. The prepared resin is referred to as $UO_2R_2$. A specific amount of the resin was then introduced into a measured volume of a uranyl nitrate solution containing specified amounts of the thorium isotope, $UX_1({_{90}}Th^{234})$. The concentrations of resins and ions are shown in part II of the following table. One-half hour was allowed to elapse with the solution in contact with the resin to permit substantially complete adsorption of the thorium, and the resin was then separated and the solution and resin analyzed by radiometric and gravimetric methods, and the results are shown in part III of the table. The percentages of thorium adsorbed are shown in part IV of the table.

*Table*

| I | II Initial concentrations of adsorbent and ionic species by analysis, moles/liter [1] | | | III Final concentrations by analysis, moles/liter | | | | IV |
|---|---|---|---|---|---|---|---|---|
| Wt. of air-dried resin, g. | $UO_2^{++}$ | $UO_2R_2$ | Th solution | $UO_2^{++}$ | $UO_2R_2$ | Th solution | Th solid (by difference) | Percent Th adsorbed |
| 1.00 | 0.22 | 0.017 | $1 \times 10^{-7}$ | 0.22 | 0.017 | $1.5 \times 10^{-9}$ | $.98 \times 10^{-7}$ | 98.5 |
| 1.00 | .22 | .017 | $1 \times 10^{-6}$ | .22 | .017 | $1.5 \times 10^{-8}$ | $.98 \times 10^{-6}$ | 98.5 |
| 1.00 | .22 | .017 | $1 \times 10^{-5}$ | .22 | .017 | $2.0 \times 10^{-7}$ | $.98 \times 10^{-5}$ | 98 |
| 1.00 | .22 | .017 | $1 \times 10^{-4}$ | .22 | .016₈ | $2.6 \times 10^{-6}$ | $.97 \times 10^{-4}$ | 97.4 |
| 1.00 | .22 | .017 | $1 \times 10^{-3}$ | .22₂ | (.015) | $5.0 \times 10^{-5}$ | $.95 \times 10^{-3}$ | 94.9 |

[1] Volume of solution in all cases was 50 ml. The solid phase components $UO_2R_2$ and Th solid are treated as though they existed independently in solution and the concentrations are therefore expressed as moles/liter.

It is to be understood that the foregoing experiments were carried out with a specific resin using the batch method and for the purpose of finding the variables using a minimum quantity of resin. Therefore, the variables shown are not to be considered as limitations upon the separation of thorium and uranium where a column adsorption method is used or where more than the minimum quantity of resin in relation to the amount of thorium to be adsorbed is used, since an increased quantity of resin will permit a much broader variation of the variables shown above.

The process of this invention may be further illustrated by the following example showing the separation of $UX_1$ from natural uranium by the column method using selective eluants.

EXAMPLE II

A column that consisted of a glass tube 50 in. long and 1 in. in diameter was filled to a depth of 36 in. with a synthetic organic cation exchange resin of the sulfonated phenol-formaldehyde type. The resin was converted to the acid type by passing 3 l. of 6 N $H_2SO_4$ through the column at a rate of about 40 cc./min. Three liters of distilled water was then passed through the column to remove any residual $H_2SO_4$. Five liters of 1 M uranyl nitrate hexahydrate (UNH) was next passed through the column. The 5 l. of the UNH solution contained $8.39 \times 10^8$ disintegrations per minute of $Th^{234}(UX_1)$ which is equivalent to $6.82 \times 10^{-11}$ moles of $UX_1$. The uranyl ions adsorbed upon the column were removed from the column with approximately 6 l. of 0.6 N $H_2SO_4$ and the column then washed with 2 l. of distilled water. The thorium was recovered from the column by passing 4 l. of 0.5 M oxalic acid through the column. The thorium contained in this wash solution was then concentrated by evaporating the 4 l. of the solution to 2 l. and then adding 50 mg. of thorium (as the nitrate) with stirring whereby a thorium oxalate precipitate was formed. The precipitate was allowed to settle and the supernatant then decanted off. The slurry remaining was centrifuged and the thorium oxalate was dissolved in 5 ml. of hot concentrated nitric acid. The thorium separated by this method amounted to $4.80 \times 10^8$ disintegrations per minute, a percentage yield of 57.3%.

The above detailed description has been presented for illustration and the invention is to be limited only by the scope of the following claims.

What is claimed is:

1. A method of separating thorium ions from uranium ions in an aqueous solution containing ions of uranyl uranium and ions of thorium, which comprises contacting said solution with a cation exchange resin in an amount sufficient to adsorb substantially all of the thorium ions but insufficient to adsorb all of the uranium ions and separating the solution containing unadsorbed uranium ions from the cation exchange resin containing thorium values.

2. A method of separating thorium ions and uranium ions in an aqueous mineral acid solution containing less than $10^{-3}$ M concentration of thorium ions and between 0.1 and 1 M concentration of uranyl uranium ions, which comprises contacting said solution with a sulfonated phenol-formaldehyde cation exchange resin in an amount not substantially greater than 1 g. dry resin per 1.7 milliequivalents of thorium present whereby substantially all of the thorium ions present are adsorbed leaving a substantial portion of the uranium ions in solution and separating said resin containing adsorbed thorium values from the solution.

3. A method of separating values of thorium and values of uranium, which comprises forming an aqueous mineral acid solution containing thorium ions and uranyl ions, flowing said solution through a column containing a cation exchange resin adsorbent whereby substantially all of the thorium values and a portion of the uranium values are adsorbed on the adsorbent, desorbing said adsorbed uranium values by flowing a dilute aqueous mineral acid solution through the column until substantially all adsorbed uranium values are desorbed, and desorbing said adsorbed thorium values by passing a dilute aqueous acidic solution containing a weakly acidic thorium complexing agent of the class consisting of oxalate and bisulfate ions.

4. The process of claim 3 wherein the adsorbent is a resin of the phenol-formaldehyde polymeric type containing free methylene sulfonic acid, carboxyl and phenolic groups.

5. The process of claim 3 wherein the adsorbent is a cross-linked aromatic hydrocarbon polymeric resin containing nuclear sulfonic acid groups.

6. The process of claim 3 wherein the uranium eluant is a 0.25 M $H_2SO_4$ solution.

7. The process of claim 3 wherein the thorium eluant is a 0.5 M $H_2C_2O_4$ solution.

8. The process of claim 3 wherein the thorium eluant is a 1.25 M $HSO_4^-$ eluant.

9. A method of separating thorium from uranium values present in a solution containing less than $10^{-3}$ M thorium ions and between 0.1 and 1 M uranyl ions, which comprises flowing said solution through a column containing phenolformaldehyde type resin whereby substantially all of the thorium ions are adsorbed thereon and at least a portion of the uranium ions are adsorbed thereon, flowing a uranium eluant that is between 0.1 and 0.4 M in sulfuric acid through said column whereby at least a portion of the adsorbed uranyl ions are desorbed and collecting said desorbed uranyl ions as a substantially separate fraction, passing a thorium eluant that is approximately 0.5 M in $H_2C_2O_4$ through said column whereby at least a portion of the thorium ions are desorbed and collecting said thorium-containing portion as a substantially separate fraction.

References Cited in the file of this patent

Tompkins et al.: Ion Exchange as a Separations Method, Journal of the American Chemical Society, vol. 69, pages 2769–2777 (1947).

Spedding et al.: The Separation of Rare Earths by Ion Exchange, Journal of the American Chemical Society, vol. 69, pages 2777–2781 (1947).

Marinsky et al.: The Chemical Identification of Radioisotopes of Neodymium and of Element 61, Journal of the American Chemical Society, vol. 69, pages 2781–2785.